(12) United States Patent
Morita et al.

(10) Patent No.: US 9,350,459 B2
(45) Date of Patent: May 24, 2016

(54) OPTICAL RECEPTION CIRCUIT, OPTICAL RECEPTION DEVICE, AND OPTICAL TRANSMISSION SYSTEM

(71) Applicant: Sony Corporation, Tokyo (JP)

(72) Inventors: Hiroshi Morita, Kanagawa (JP); Hideyuki Suzuki, Kanagawa (JP); Koki Uchino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/476,934

(22) Filed: Sep. 4, 2014

(65) Prior Publication Data

US 2015/0098711 A1 Apr. 9, 2015

(30) Foreign Application Priority Data

Oct. 7, 2013 (JP) ................................ 2013-209888

(51) Int. Cl.
*H04B 10/69* (2013.01)
(52) U.S. Cl.
CPC .................... *H04B 10/693* (2013.01)
(58) Field of Classification Search
CPC .............................. H04B 10/69; H04B 10/693
USPC ......................................... 330/301; 327/309
See application file for complete search history.

(56) References Cited

U.S. PATENT DOCUMENTS

| | | | | |
|---|---|---|---|---|
| 2004/0075484 A1* | 4/2004 | Nishizono | ............... | H03F 3/087 327/345 |
| 2005/0258885 A1* | 11/2005 | Ono | ........................ | H03F 3/087 327/307 |
| 2008/0317406 A1* | 12/2008 | Santori | ............... | H04B 10/803 385/24 |
| 2013/0163995 A1* | 6/2013 | Uemura | ............... | H04B 10/504 398/136 |

FOREIGN PATENT DOCUMENTS

JP 2005-167971 6/2005

* cited by examiner

*Primary Examiner* — Leslie Pascal
(74) *Attorney, Agent, or Firm* — Michael Best & Friedrich LLP (57) ABSTRACT

Into a current-voltage conversion unit, a single-end current signal which is a photoelectrically converted optical signal is input. The current-voltage conversion unit converts the single-end current signal into a single-end voltage signal and outputs the converted signal from an output terminal.
An input terminal of an amplifier unit is connected to the output terminal of the current-voltage conversion unit. The amplifier unit amplifies the single-end voltage signal to predetermined amplitude set in advance and outputs the amplified signal from an output terminal. Then, an input terminal of a differential conversion unit is connected to the output terminal of the amplifier unit. The differential conversion unit outputs a differential voltage signal which is a differentiated single-end voltage signal amplified in the amplifier unit. The present technique can be applied, for example, to an optical transmission system.

11 Claims, 10 Drawing Sheets

OPTICAL RECEPTION CIRCUIT, OPTICAL RECEPTION DEVICE, AND OPTICAL TRANSMISSION SYSTEM

CROSS REFERENCE TO RELATED APPLICATIONS

This application claims the benefit of Japanese Priority Patent Application JP 2013-209888 filed on Oct. 7, 2013, the entire contents of which are incorporated herein by reference.

TECHNICAL FIELD

The present disclosure relates to an optical reception circuit, an optical reception device, and an optical transmission system. Specifically, the present disclosure relates to an optical reception circuit, an optical reception device, and an optical transmission system which can reduce a circuit area.

BACKGROUND ART

In related art, in an optical transmission system to transmit data with light, an optical transmission device optically converts an electric signal and transmits data. An optical reception device receives the data by electrically converting the light.

For example, in the optical transmission device, an electric signal output from a driving circuit is converted optically by an electro-optical conversion element (such as laser diode or vertical cavity surface emitting laser (VCSEL)) and is transmitted through an optical fiber. Then, in the optical reception device, voltage-conversion is performed, by an optical reception circuit, on a current signal photoelectrically converted by a light receiving element (such as photo diode) and amplitude of the signal is amplified.

Then, the signal is supplied to a circuit (such as clock and data recovery (CDR) or demultiplexer (De-MUX)) in a subsequent stage.

Generally, in the optical reception circuit, a current signal is converted into a voltage signal by a current-voltage conversion circuit (such as transimpedance amplifier (TIA)) and the signal is differentiated and transmitted to a circuit in a subsequent stage (see, for example, PTL 1).

CITATION LIST

Patent Literature

[PTL 1]
JP 2005-167971 A

SUMMARY

Technical Problem

Incidentally, when communication from an optical transmission device to an optical reception device is performed, power loss in a connection part of an optical fiber or power loss during conversion from electricity into light or from light to electricity, or the like is large. Thus, there has been a case where a signal is attenuated and amplitude of a current signal output from a light receiving element becomes small. In such a manner, when the amplitude of the current signal output from the light receiving element is small, it is necessary to apply a countermeasure against noise. Thus, a circuit area and electric power consumption are increased.

The present disclosure has been made in view of such a circumstance and is to reduce a circuit area.

Solution to Problem

An optical reception circuit of an aspect of the present disclosure includes: a current-voltage conversion unit to which a single-end current signal, which is a photoelectrically converted optical signal, is input and which is configured to convert the single-end current signal into a single-end voltage signal and to output the converted signal from an output terminal; an amplifier unit an input terminal of which is connected to the output terminal of the current-voltage conversion unit and which is configured to amplify the single-end voltage signal to predetermined amplitude set in advance and to output the amplified signal from an output terminal; and a differential conversion unit an input terminal of which is connected to the output terminal of the amplifier unit and which is configured to output a differential voltage signal which is a differentiated single-end voltage signal amplified in the amplifier unit. An optical reception device of an aspect of the present disclosure includes: a light receiving element configured to output a single-end current signal which is a photoelectrically converted optical signal; a current-voltage conversion unit to which the single-end current signal is input from the light receiving element and which is configured to convert the single-end current signal into a single-end voltage signal and to output the converted signal from an output terminal; an amplifier unit an input terminal of which is connected to the output terminal of the current-voltage conversion unit and which is configured to amplify the single-end voltage signal to predetermined amplitude set in advance and to output the amplified signal from an output terminal; and a differential conversion unit an input terminal of which is connected to the output terminal of the amplifier unit and which is configured to output a differential voltage signal which is a differentiated single-end voltage signal amplified in the amplifier unit. An optical transmission system of an aspect of the present disclosure includes: an optical transmission device including an optical transmission circuit configured to convert an optically transmitted signal into a current signal and a light source for optical communication configured to convert the current signal, which is converted in the optical transmission circuit, into an optical signal; and an optical reception device including a light receiving element configured to receive the optical signal through an optical transmission path and to output a single-end current signal which is the optical signal converted photoelectrically and an optical reception circuit configured to perform voltage conversion on the current signal output from the light receiving element, wherein the optical reception circuit includes a current-voltage conversion unit to which a single-end current signal, which is a photoelectrically converted optical signal, is input and which is configured to convert the single-end current signal into a single-end voltage signal and to output the converted signal from an output terminal, an amplifier unit an input terminal of which is connected to the output terminal of the current-voltage conversion unit and which is configured to amplify the single-end voltage signal to predetermined amplitude set in advance and to output the amplified signal from an output terminal, and a differential conversion unit an input terminal of which is connected to the output terminal of the amplifier unit and which is configured to output a differential voltage signal which is a differentiated single-end voltage signal amplified in the amplifier unit. In an aspect of the present disclosure, in a current-voltage conversion unit, a single-end current signal which is a photoelectrically converted optical signal is input and the single-end current signal is converted into a single-end voltage signal and output from an output terminal of the current-voltage conversion unit, in an amplifier unit, the single-end voltage signal is amplified to predetermined amplitude set in advance and is output from an output terminal of the amplifier unit, and in a differential conversion unit, a differential voltage signal which is a differentiated single-end voltage signal amplified in the amplifier unit is output. Then, an input terminal of the amplifier unit is connected to the output terminal of the current-voltage conversion unit and an input terminal of the differential conversion unit is connected to the output terminal of the amplifier unit.

Advantageous Effects of Invention

According to an aspect of the present disclosure, a circuit area can be reduced.

DESCRIPTION OF EMBODIMENTS

In the following, specific embodiments to which the present technique is applied will be described in detail with reference to the drawings.

Figure 1:
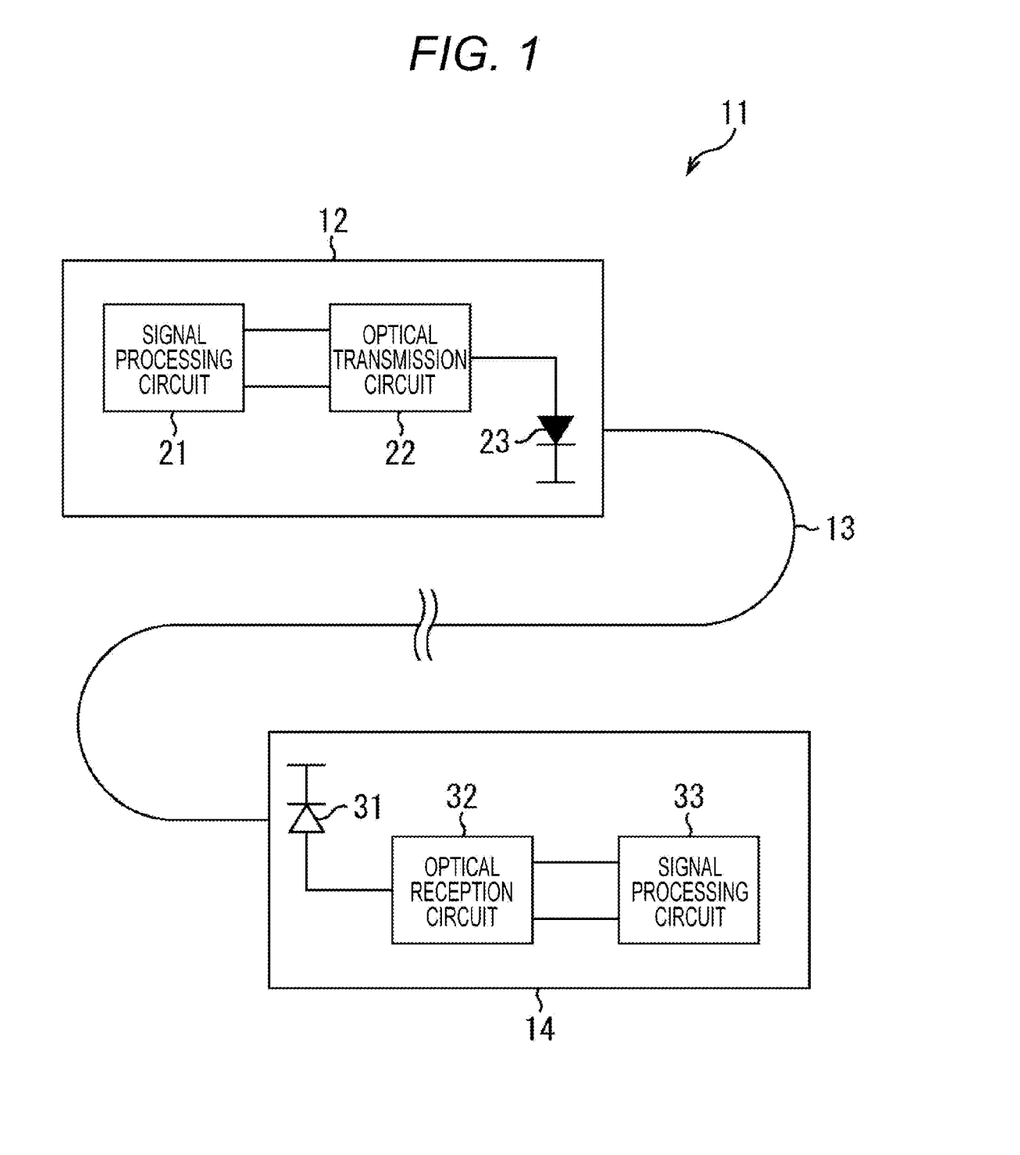
FIG. 1 is a block diagram illustrating an example configuration of an embodiment of an optical transmission system to which the present technique is applied.

FIG. 1 is a block diagram illustrating an example configuration of an embodiment of an optical transmission system to which the present technique is applied. In this specification, a system means an entire apparatus formed with more than one device.

As illustrated in FIG. 1, an optical transmission system 11 is configured by an optical transmission device 12 and an optical reception device 14 being connected to each other through an optical transmission path 13 such as an optical fiber. An optical signal is transmitted to the optical reception device 14 from the optical transmission device 12. The optical transmission device 12 includes a signal processing circuit 21, an optical transmission circuit 22, and a light source for optical communication 23. The optical reception device 14 includes a light receiving element 31, an optical reception circuit 32, and a signal processing circuit 33.

The signal processing circuit 21 performs signal processing to generate a signal corresponding to optically transmitted data and supplies, for example, a differential voltage signal including a pair of voltage signals of inverted phases to the optical transmission circuit 22.

The optical transmission circuit 22 converts the differential voltage signal supplied from the signal processing circuit 21 into a current signal and supplies the converted signal to the light source for optical communication 23.

The light source for optical communication 23 transmits, through the optical transmission path 13, an optical signal which is the current signal supplied from the optical transmission circuit 22 and is converted into light. As the light source for optical communication 23, for example, a semiconductor laser such as a vertical cavity surface emitting laser (VCSEL) is used.

The light receiving element 31 receives, through the optical transmission path 13, the optical signal transmitted from the light source for optical communication 23 and performs photoelectric conversion. Then, the light receiving element 31 outputs a current signal corresponding to the optical signal.

The optical reception circuit 32 supplies, to the signal processing circuit 33, a differential voltage signal which is the current signal output from the light receiving element 31, voltage conversion being performed on the current signal. The signal processing circuit 33 performs signal processing on the differential voltage signal supplied from the optical reception circuit 32 and receives data transmitted optically from the optical transmission device 12.

In such a manner, in the optical transmission system 11, the current signal output from the optical transmission circuit 22 is electric-optically converted by the light source for optical communication 23, an optical signal is transmitted through the optical transmission path 13, and the current signal photoelectrically converted by the light receiving element 31 is received by the optical reception circuit 32. Here, before description of the optical reception circuit 32 to which the present technique is applied, an optical reception circuit in related art will be described with reference to FIG. 2 to FIG. 4B.

Figure 2:
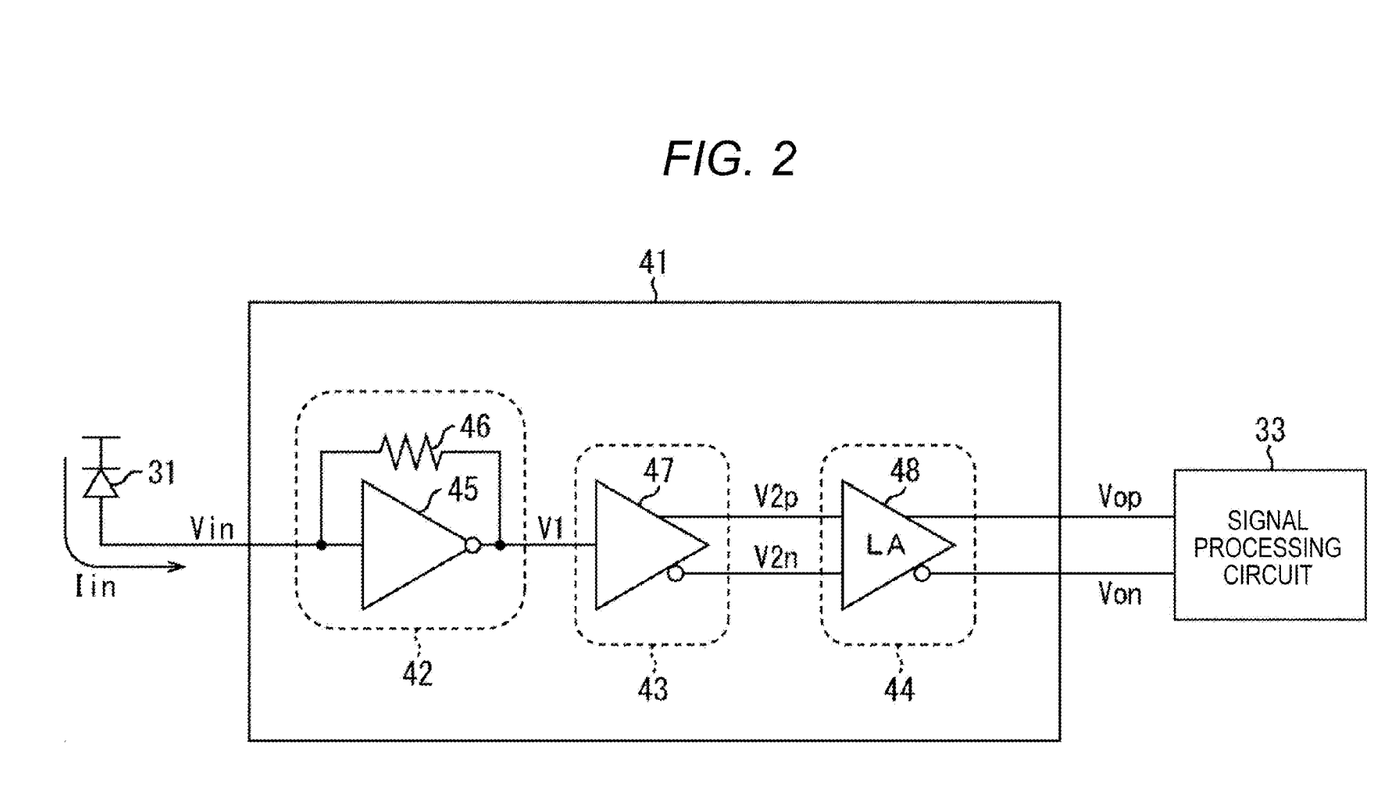
FIG. 2 is a view illustrating a general example configuration of an optical reception circuit in related art.
Figure 3A:
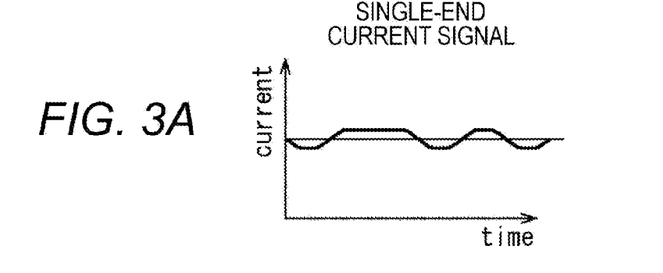
FIG. 3A to FIG. 3D are views illustrating a current signal and a voltage signal in the optical reception circuit.
Figure 3B:
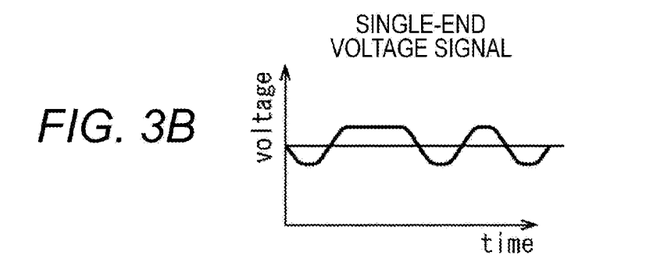
Figure 3C:
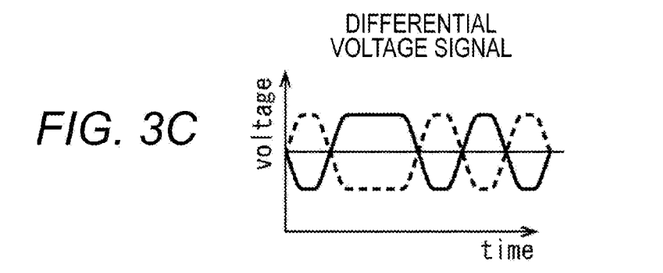
Figure 3D:
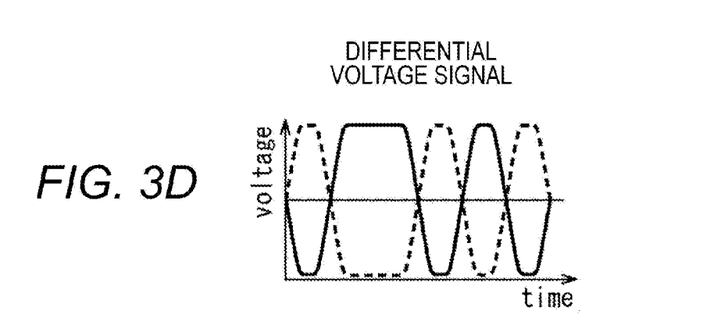

In FIG. 2, a general example configuration of the optical reception circuit 41 in the related art is illustrated. As illustrated in FIG. 2, the optical reception circuit 41 includes a current-voltage conversion unit 42, a differential conversion unit 43, and an amplifier unit 44. The optical reception circuit 41 receives a single-end current signal Iin output from the light receiving element 31 and supplies differential voltage signals Vop and Von to the signal processing circuit 33.

The current-voltage conversion unit 42 includes an amplifier 45 and a feedback resistance 46. For example, the current-voltage conversion unit 42 performs current-voltage conversion on a single-end current signal Iin illustrated in FIG. 3A and outputs a single-end voltage signal V1 illustrated in FIG. 3B.

The differential conversion unit 43 includes an amplifier 47. The differential conversion unit 43 differentiates the single-end voltage signal V1 on which current-voltage conversion is performed by the current-voltage conversion unit 42 and outputs differential voltage signals V2$p$ and V2$n$ illustrated in FIG. 3C. Note that in FIG. 3C, the differential voltage signal V2$p$ which is a positive signal is indicated by a solid line and the differential voltage signal V2$n$ which is a negative signal is indicated by a dashed line.

The amplifier unit 44 includes a limiting amplifier 48. The amplifier unit 44 amplifies the differential voltage signals V2$p$ and V2$n$, which are differentiated by the differential conversion unit 43, to predetermined amplitude set in advance and outputs differential voltage signals Vop and Von illustrated in FIG. 3D. Note that in FIG. 3D, the differential voltage signal Vop which is a positive signal is indicated by a solid line and the differential voltage signal Von which is a negative signal is indicated by a dashed line.

Incidentally, as described above, there has been a case where a transmitted signal is attenuated due to power loss in a connection part of the optical transmission path 13 or power loss during electric-optic conversion, photoelectric conversion, or the like and a case where amplitude of the single-end current signal Iin output from the light receiving element 31 becomes small. When the single-end voltage signal V1 which is the single-end current signal Iin, which has such small amplitude and on which current-voltage conversion is performed, is differentiated by the differential conversion unit 43, it is necessary to prevent the signal from being buried in noise such as thermal noise.

Figure 4A:
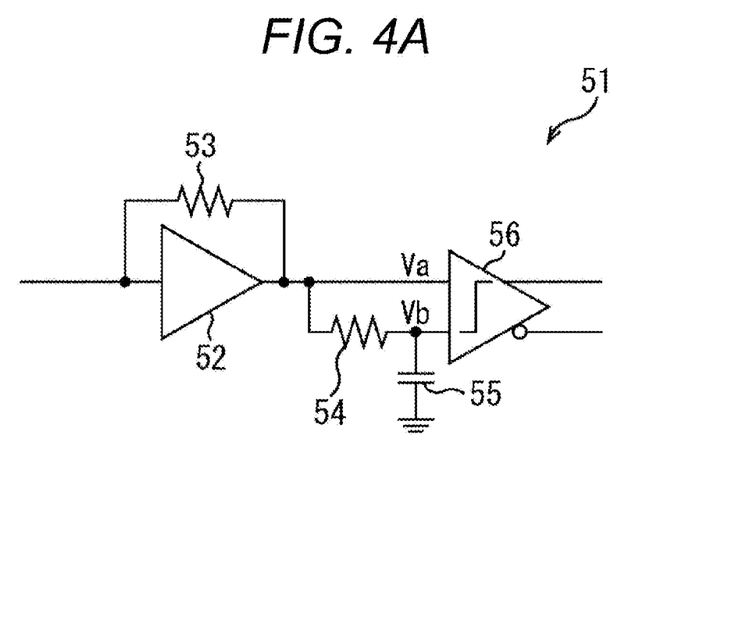
FIG. 4A and FIG. 4B are views respectively illustrating general differential conversion circuits.
Figure 4B:
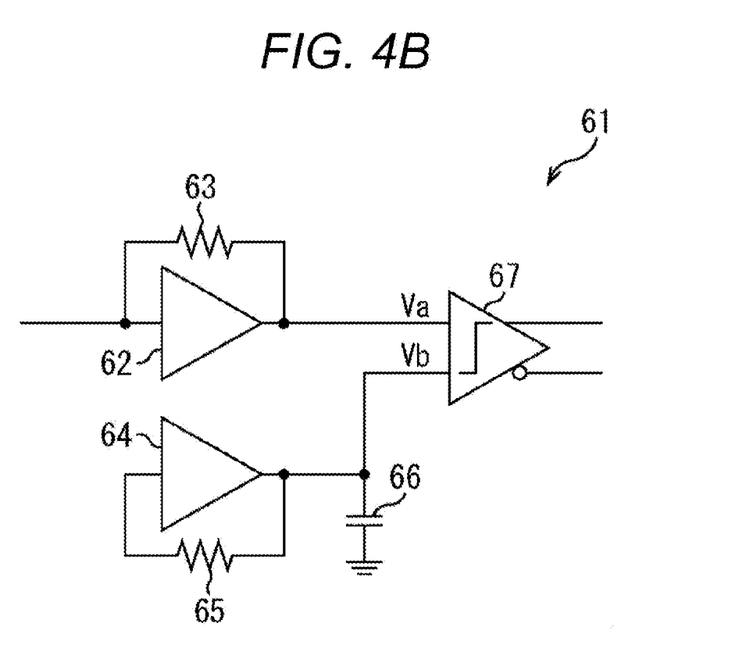

For example, in FIG. 4A and FIG. 4B, general differential conversion circuits (differential conversion unit) are illustrated. In FIG. 4A, an RC-type differential generation circuit 51 is illustrated. In FIG. 4B, a dummy-type differential generation circuit 61 is illustrated. As illustrated in FIG. 4A, the RC-type differential generation circuit 51 includes an amplifier 52, a feedback resistance 53, a resistance 54, a capacitor 55, and an amplifier 56. Then, in the RC-type differential generation circuit 51, a DC component is extracted from a main signal by a low pass filter including the resistance 54 and the capacitor 55 and reference potential Vb is generated. Here, although depending on a cutoff frequency of the low pass filter, sizes of the resistance and the capacitor become generally large. Thus, since it is desired that the RC-type differential generation circuit 51 has a high signal to noise ratio, the capacitor 55 having a large capacity becomes necessary as a filter to remove a noise component generated in the reference potential Vb and an area is increased. Also, as illustrated in FIG. 4B, the dummy-type differential generation circuit 61 includes an amplifier 62, a feedback resistance 63, an amplifier 64, a feedback resistance 65, a capacitor 66, and an amplifier 67. In the dummy-type differential generation circuit 61, a dummy circuit equivalent to a main path is configured by the amplifier 64 and the feedback resistance 65. The reference potential Vb is generated in the dummy circuit.

However, in the dummy-type differential generation circuit 61, an area of the capacitor 66 which functions as a noise control filter becomes large as electric power consumption and a circuit area of the dummy circuit including the amplifier 64 and the feedback resistance 65 become large. As described, the differential generation circuit in the related art has a disadvantage that the electric power consumption and the circuit area are increased. Thus, it is desired to prevent the circuit area from being increased and to control the electric power consumption.

Figure 5:
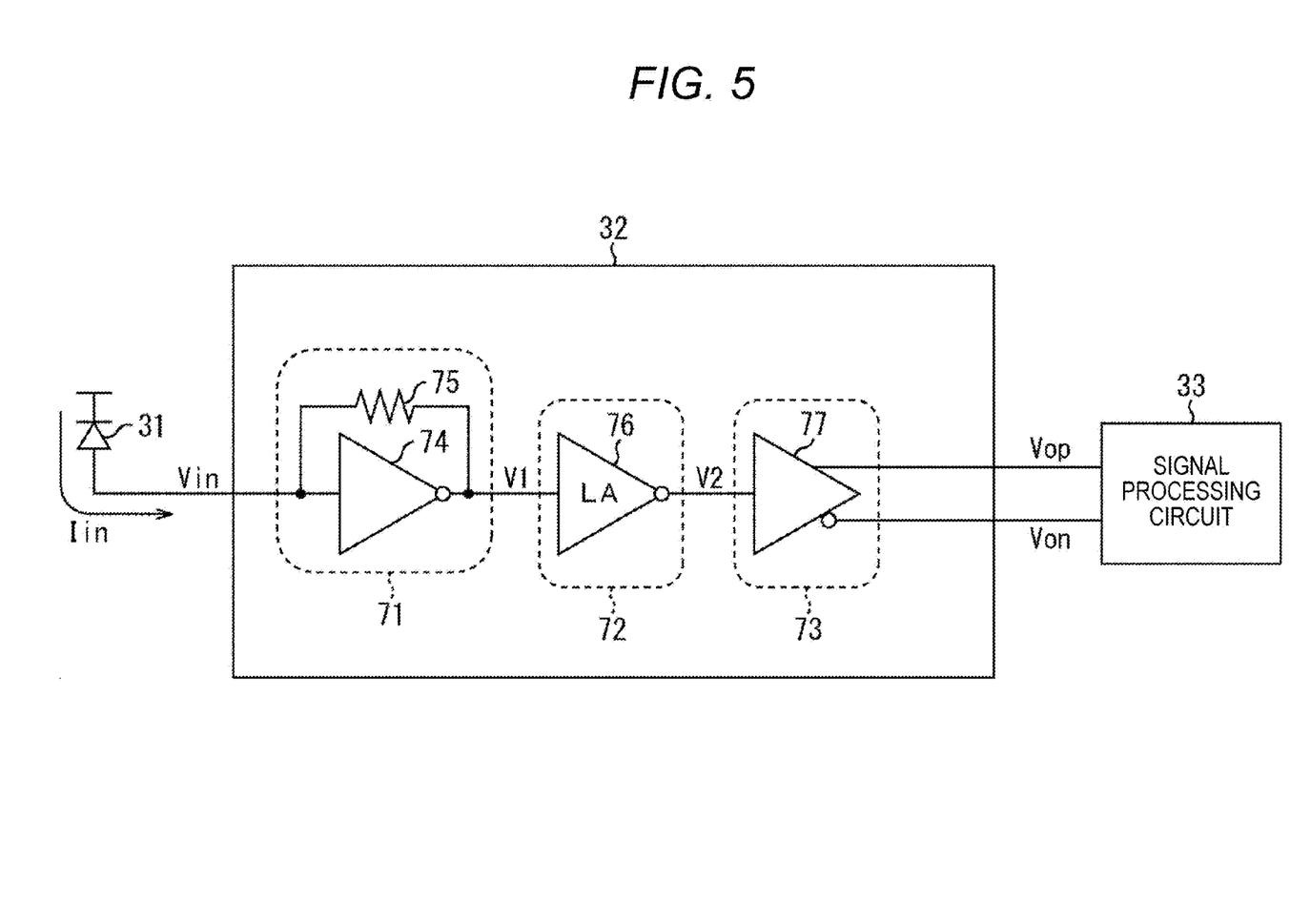
FIG. 5 is a block diagram illustrating an example configuration of an embodiment of an optical reception circuit to which the present technique is applied.

FIG. 5 is a block diagram illustrating an example configuration of an embodiment of the optical reception circuit 32 to which the present technique is applied.

As illustrated in FIG. 5, the optical reception circuit 32 includes a current-voltage conversion unit 71, an amplifier unit 72, and a differential conversion unit 73. The optical reception circuit 32 receives the single-end current signal Iin output from the light receiving element 31 and supplies the differential voltage signals Vop and Von to the signal processing circuit 33. Also, in the optical reception circuit 32, an output terminal of the light receiving element 31 is connected to an input terminal of the current-voltage conversion unit 71. Also, an input terminal of the amplifier unit 72 is connected to an output terminal of the current-voltage conversion unit 71 and an input terminal of the differential conversion unit 73 is connected to an output terminal of the amplifier unit 72.

Figure 6A:
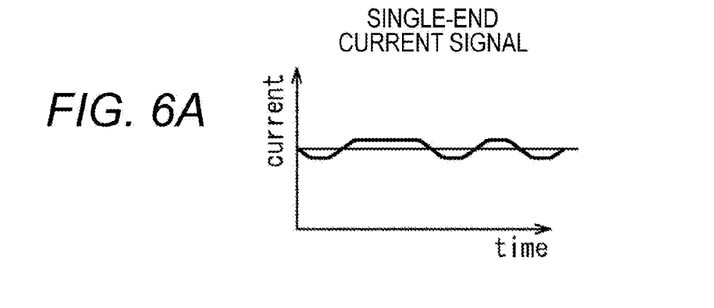
FIG. 6A to FIG. 6D are views illustrating a current signal and a voltage signal in the optical reception circuit.
Figure 6B:
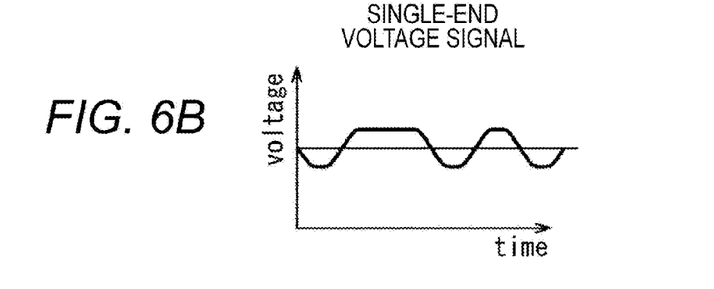

The current-voltage conversion unit 71 includes an amplifier 74 and a feedback resistance 75. For example, the current-voltage conversion unit 71 performs current-voltage conversion on the single-end current signal Iin illustrated in FIG. 6A and outputs the single-end voltage signal V1 illustrated in FIG. 6B. In FIG. 6A, the single-end current signal Iin input into the input terminal of the current-voltage conversion unit 71 is illustrated. In FIG. 6B, the single-end voltage signal V1 output from the output terminal of the current-voltage conversion unit 71 is illustrated.

Figure 6C:
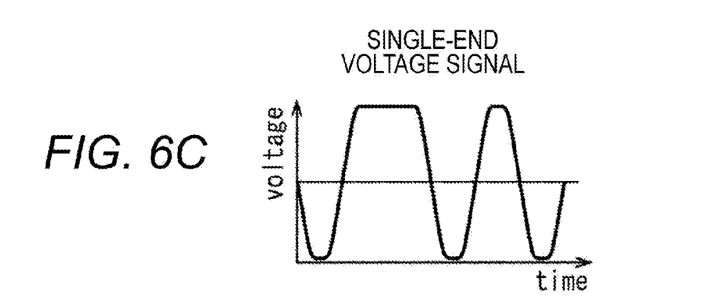

The amplifier unit 72 includes a limiting amplifier 76. The amplifier unit 72 amplifies the single-end voltage signal V1 output from the current-voltage conversion unit 71 to predetermined amplitude set in advance, the single-end voltage signal V1 being kept single-ended. Then, the amplifier unit 72 outputs a single-end voltage signal V2 illustrated in FIG. 6C. In FIG. 6C, the single-end voltage signal V2 output from the output terminal of the amplifier unit 72 is illustrated.

Figure 6D:
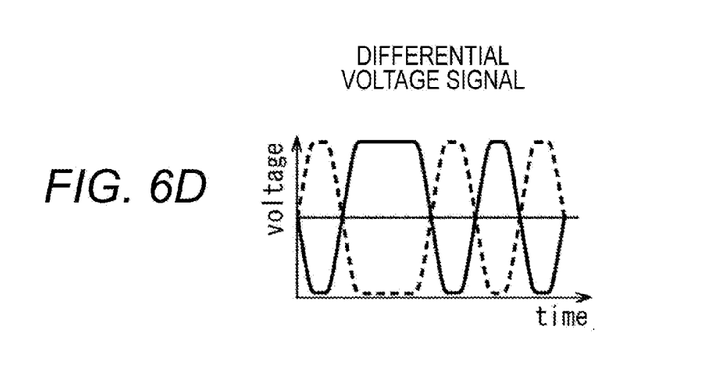

The differential conversion unit 73 includes an amplifier 77. The differential conversion unit 73 differentiates the single-end voltage signal amplified by the amplifier unit 72 and outputs the differential voltage signals Vop and Von illustrated in FIG. 6D. In FIG. 6D, the differential voltage signal Vop which is a positive signal output from the differential conversion unit 73 is indicated by a solid line and the differential voltage signal Von which is a negative signal is indicated by a dashed line.

The optical reception circuit 32 is configured in such a manner. In the differential conversion unit 73, the amplifier 77 differentiates the single-end voltage signal which is limited and amplified in predetermined amplitude by the limiting amplifier 76. Thus, since a signal level of a single-end voltage signal to be differentiated is higher than a level of noise generated in the reference signal, it is not necessary to consider an influence of the noise and a filter to control the noise becomes unnecessary in the differential conversion unit 73. Thus, compared, for example, to the RC-type differential generation circuit 51 and the dummy-type differential generation circuit 61 illustrated in FIG. 4A and FIG. 4B, the differential conversion unit 73 can reduce a circuit area.

Figure 7:
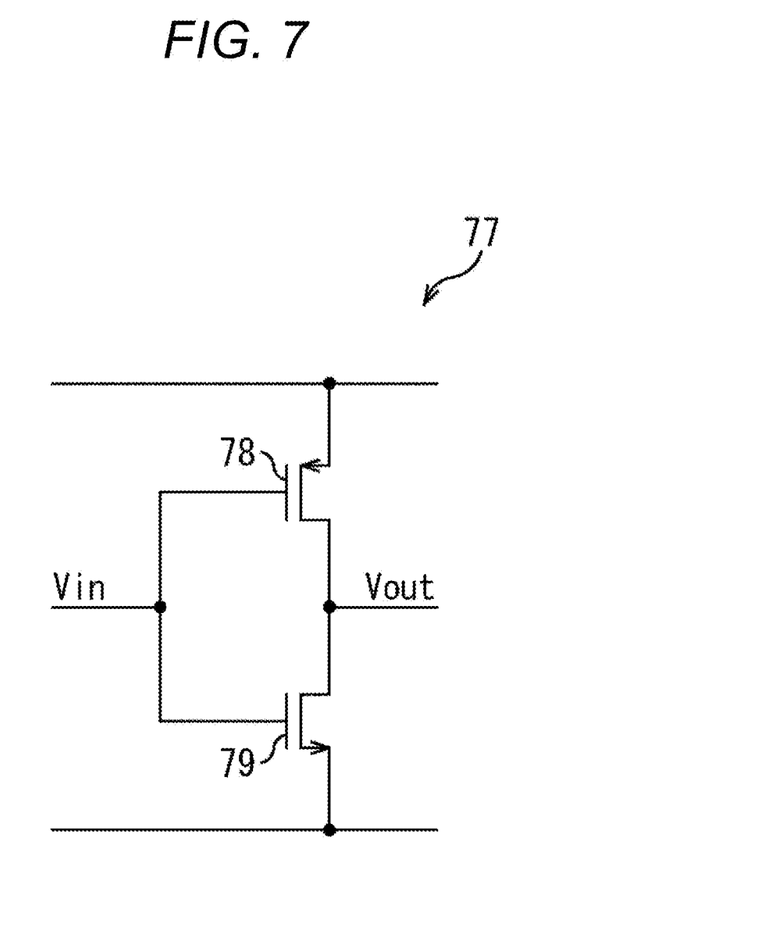
FIG. 7 is a view illustrating an example configuration of an inverter-type amplifier.

Also, in the differential conversion unit 73, an amplifier 77, which includes a complementary metal oxide semiconductor (CMOS)-type inverter circuit including a combination of a positive channel metal oxide semiconductor (PMOS)-type transistor 78 and a negative channel metal oxide semiconductor (NMOS)-type transistor 79 illustrated in FIG. 7, can be employed. Thus, in the differential conversion unit 73, for example, the RC-type differential generation circuit 51, the dummy-type differential generation circuit 61, or the like, which generates the reference potential Vb and is illustrated in FIG. 4A and FIG. 4B, becomes unnecessary and electric power consumption can be reduced compared to the related art.

In such a manner, the optical reception circuit 32 can reduce a circuit area and electric power consumption compared to the related art.

Figure 8A:
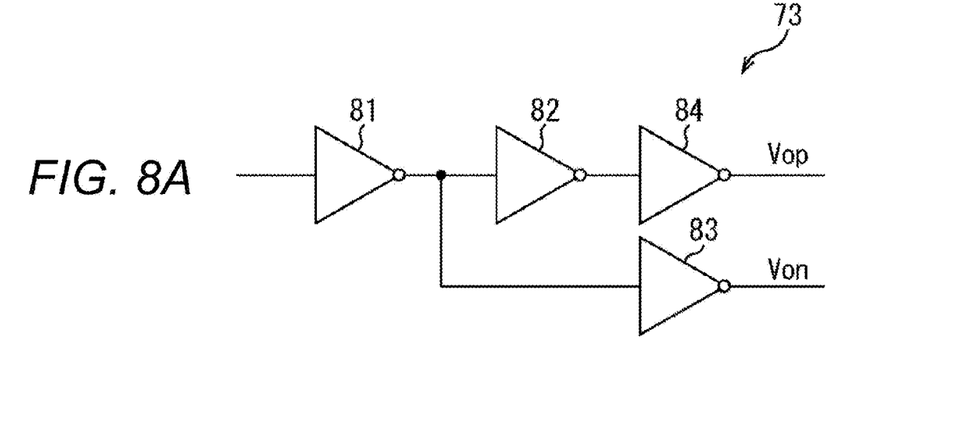
FIG. 8A to FIG. 8E are views illustrating an example configuration of a differential conversion unit.

Next, in FIG. 8A to FIG. 8E, an example configuration of the differential conversion unit 73 in FIG. 5 is illustrated. As illustrated in FIG. 8A, the differential conversion unit 73 includes four amplifiers 81 to 84.

To an input terminal of the amplifier 81, an output terminal of the amplifier unit 72 in FIG. 5 is connected. Then, in the differential conversion unit 73, input terminals of the amplifier 82 and the amplifier 83 are connected to an output terminal of the amplifier 81 and an input terminal of the amplifier 84 is connected to an output terminal of the amplifier 82. Also, for example, each of the amplifiers 81 to 84 includes the static CMOS-type inverter circuit illustrated in FIG. 7.

Figure 8B:
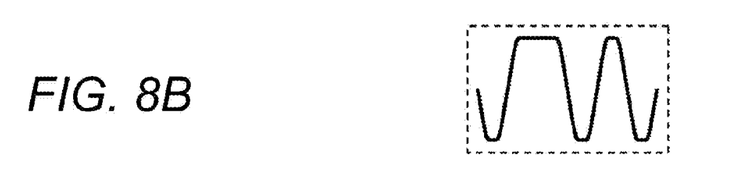
Figure 8C:
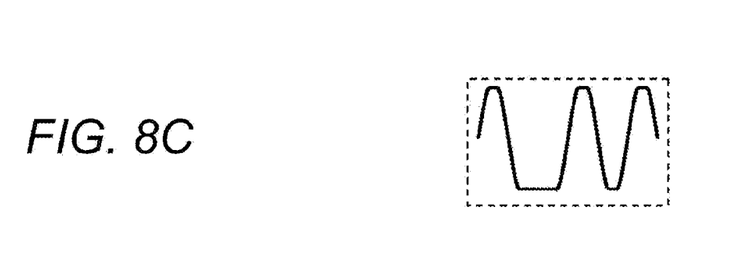
Figure 8D:
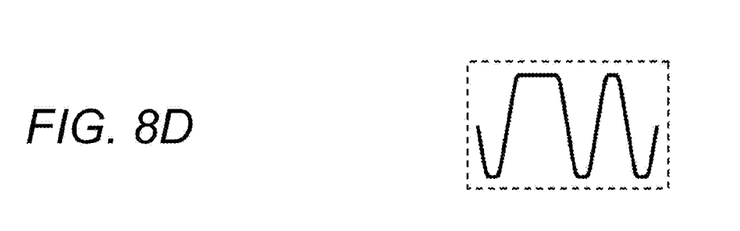
Figure 8E:
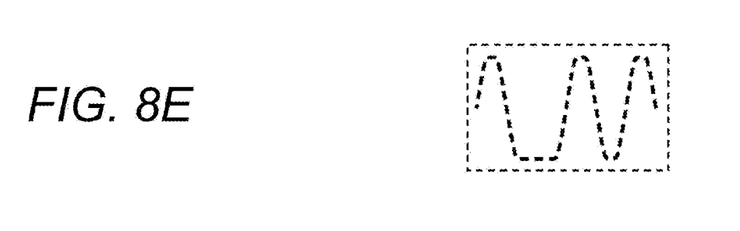

In FIG. 8B, a voltage signal output from the amplifier 81 is illustrated. In FIG. 8C, a voltage signal output from the amplifier 82 is illustrated. Also, in FIG. 8D, the differential voltage signal Vop which is a positive signal output from the amplifier 84 is illustrated. In FIG. 8E, the differential voltage signal Von which is a negative signal output from the amplifier 83 is illustrated.

As described, the amplitude of the single-end voltage signal supplied from the amplifier unit 72 to the differential conversion unit 73 is limited and amplified by the limiting amplifier 76. Thus, for example, unlike the differentiation, by the differential conversion unit 43, of the single-end voltage signal output from the current-voltage conversion unit 42, which differentiation has been described with reference to FIG. 2, it is easy to handle a signal in the differential conversion unit 73. Thus, as illustrated in FIG. 8A to FIG. 8E, in the differential conversion unit 73, differentiation can be performed by adding a stage of a polarity inversion amplifier, and thus, it is possible to reduce a circuit area and electric power consumption compared to the related art.

Next, with reference to FIG. 9A to FIG. 9C, a duty correction of the amplifier unit 72 will be described.

Figure 9A:
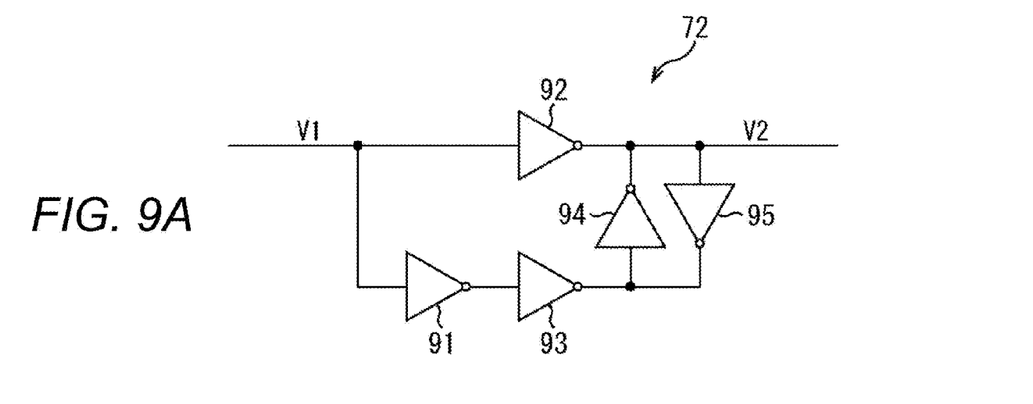
FIG. 9A to FIG. 9C are views for describing a duty correction of an amplifier unit.
Figure 9B:
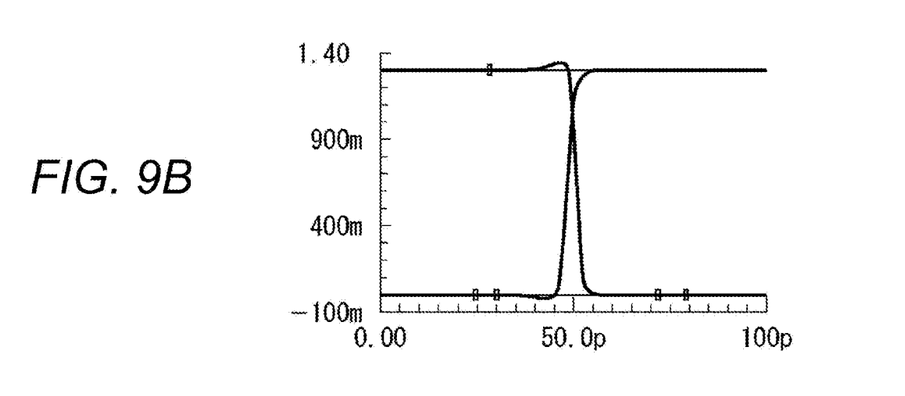
Figure 9C:
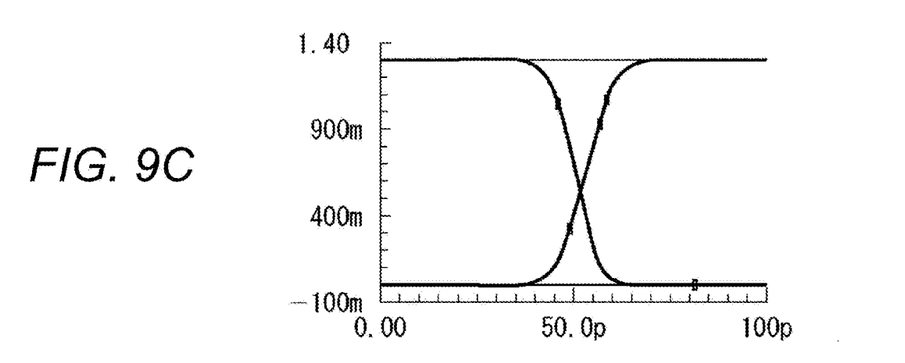

As illustrated in FIG. 9A, the amplifier unit 72 includes a combination of amplifiers 91 to 95.

To the output terminal of the current-voltage conversion unit 71 in FIG. 5, an amplifier for differential generation 91 is connected in addition to an input terminal of the amplifier 92. To an output terminal of the amplifier 91, an input terminal of the amplifier 93 is connected. Then, the amplifiers 94 and 95 are connected in a crossed manner between a signal, on which a pseudo differentiation is performed and which is output from the amplifier 93, and a main signal output from the amplifier 92.

That is, in a circuit configuration, an input terminal of the amplifier 94 and an output terminal of the amplifier 95 are connected to an output terminal of the amplifier 93 and an output terminal of the amplifier 94 and an input terminal of the amplifier 95 are connected to an output terminal of the amplifier 92. In the amplifier unit 72 of such a circuit configuration, a duty can be corrected.

For example, in the related art, when single-end amplification is performed, a crossed point of an eye diagram has been easily shifted upward and downward due to an influence of process variation or the like. In the eye diagram, a great number of transitions of a signal waveform is sampled, superimposed on each other, and displayed. For example, in FIG. 9B, a waveform (signal amplified and output in single end) of an eye diagram in which the crossed point is shifted upward is illustrated. Specifically, in an inverter-type amplifier, a significant gap has been generated.

On the other hand, in the amplifier unit 72, the circuit configuration described with reference to FIG. 9A is employed.

Thus, for example, a duty correction can be performed even when each of the amplifiers 91 to 95 includes the static CMOS-type inverter circuit illustrated in FIG. 7. That is, as illustrated in FIG. 9C, the amplifier unit 72 can control generation of a gap in a crossed point of the eye diagram. Thus, by employing the amplifiers 91 to 95, each of which includes the static CMOS-type inverter circuit, the amplifier unit 72 can output a differential voltage signal, which has a better waveform, with lower electric power consumption. Next, with reference to FIG. 10, an example configuration of an optical communication chip including a plurality of optical reception circuits 32 will be described.

Figure 10:
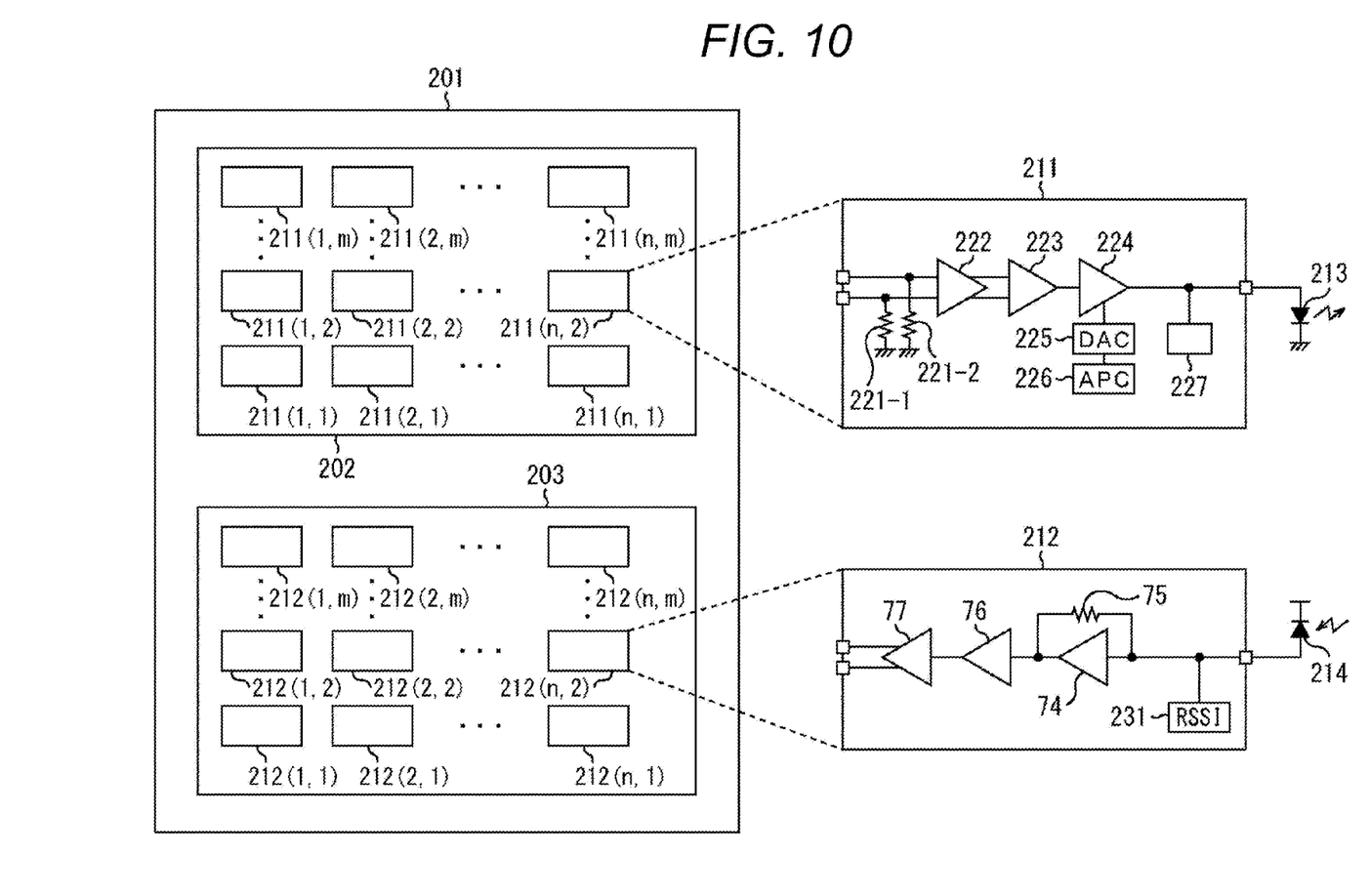
FIG. 10 is a view illustrating an example configuration of an optical communication chip including a plurality of optical reception circuits.

As illustrated in FIG. 10, an optical communication chip 201 includes an optical transmission block 202 and an optical reception block 203. The optical communication chip 201 is mounted, for example, to an optical communication device including functions of both of the optical transmission device 12 and the optical reception device 14 which are in FIG. 1. That is, the optical communication chip 201 can transmit an optical signal through an optical transmission path 13 in a manner similar to the optical transmission device 12 and can receive an optical signal in a manner similar to the optical reception device 14.

Also, in the optical communication chip 201, the optical transmission block 202 includes a plurality of transmission units 211 and the optical reception block 203 includes a plurality of reception units 212. For example, in the example configuration in FIG. 10, the optical transmission block 202 includes transmission units 211 (1, 1) to 211 (n, m) arranged in a matrix of m rows×n columns on a single plane. Similarly, the optical reception block 203 includes reception units 212 (1, 1) to 212 (n, m) arranged planarly in m rows×n columns. Here, m and n are arbitrary integer numbers.

Also, in the optical communication chip 201, light sources for optical communication 213 are respectively connected to the transmission units 211 in the optical transmission block 202 and light receiving elements 214 are respectively connected to the reception units 212 in the optical reception block 203.

Thus, in the optical communication chip 201, the plurality of transmission units 211 included in the optical transmission block 202 can respectively transmit optical signals from the light sources for optical communication 213 to a plurality of reception units 212 included in an optical reception block 203 of a different optical communication chip 201 to be a communication partner. Also, in the optical communication chip 201, the plurality of reception units 212 included in the optical reception block 203 can respectively receive, with the light receiving elements 214, optical signals transmitted from a plurality of transmission units 211 included in an optical transmission block 202 of a different optical communication chip 201 to be a communication partner.

Also, each of the transmission units 211 includes resistances 221-1 and 221-2, an input buffer 222, a pre-driver 223, a laser diode driver (LDD) 224, a digital analog converter (DAC) 225, an automatic power control (APC) 226, and a laser diode monitoring circuit 227.

The resistances 221-1 and 221-2 are respectively connected between GND and two signal lines each of which inputs, to the input buffer 222, a differential signal supplied from a signal processing circuit (not illustrated). The input buffer 222 temporarily holds the differential signal supplied from the signal processing circuit (not illustrated), compensates for a loss in a predetermined range of a high frequency wave, and secures a predetermined data pulse width.

The pre-driver 223 amplifies the differential signal, which is supplied from the input buffer 222, to a predetermined voltage and supplies a single-end voltage signal to the laser diode driver 224. The laser diode driver 224 converts the single-end voltage signal, which is supplied from the pre-driver 223, into a single-end current signal and supplies the converted signal to the light source for optical communication 213. The digital analog converter 225 converts a digital control signal, which is output from the automatic power control 226, into an analog control signal and supplies the converted signal to the laser diode driver 224.

The automatic power control 226 outputs a control signal to control electric power of the current signal output from the laser diode driver 224 in such a manner that an optical signal of predetermined strength is output from the light source for optical communication 213. The laser diode monitoring circuit 227 monitors the light source for optical communication 213 and stops outputting a current signal from the laser diode driver 224 to the light source for optical communication 213 when a trouble is detected in the light source for optical communication 213.

Also, each of the reception units 212 includes a received signal strength indicator (RSSI) 231, an amplifier 74, a feedback resistance 75, a limiting amplifier 76, and an amplifier 77.

The signal strength indicator circuit 231 measures the strength of a single-end current signal supplied from the light receiving element 214 to a transimpedance amplifier 232. The amplifier 74, the feedback resistance 75, the limiting amplifier 76, and the amplifier 77 are configured in a manner similar to those of the optical reception circuit 32 illustrated in FIG. 5.

In such a manner, in the optical communication chip 201, the plurality of reception units 212 is configured in a manner similar to the above described optical reception circuit 32. In the optical communication chip 201, a plurality of optical reception circuits 32 is arranged. That is, in the optical communication chip 201, current-voltage conversion can be performed in parallel in the plurality of optical reception circuits 32. Thus, in a transmission/reception device including the optical communication chip 201 and an optical transmission system including the transmission/reception device, a circuit area and electric power consumption of the optical reception block 203 can be reduced. Thus, the optical communication chip 201 can be downsized. Note that the optical transmission block 202 and the optical reception block 203 may be configured independently from the optical communication chip 201. The optical reception device 14 (FIG. 1) may include the optical reception block 203.

Moreover, in the optical communication chip 201, since the electric power consumption can be reduced, heat generation in the optical communication chip 201 can be controlled. Thus, in the optical communication chip 201, a voltage drop of a power supply can be prevented and an influence on optical communication due to the heat can be controlled. Also, the optical communication chip 201 can reduce crosstalk between adjoining transmission units 211 and crosstalk between adjoining reception units 212, and thus, it is possible to perform communication with less noise.

The present technique can also be in the following forms.

(1)

An optical reception circuit including: a current-voltage conversion unit to which a single-end current signal, which is a photoelectrically converted optical signal, is input and which is configured to convert the single-end current signal into a single-end voltage signal and to output the converted signal from an output terminal; an amplifier unit an input terminal of which is connected to the output terminal of the current-voltage conversion unit and which is configured to amplify the single-end voltage signal to predetermined amplitude set in advance and to output the amplified signal from an output terminal; and a differential conversion unit an input terminal of which is connected to the output terminal of the amplifier unit and which is configured to output a differential voltage signal which is a differentiated single-end voltage signal amplified in the amplifier unit.

(2)

The optical reception circuit according to (1), wherein the differential conversion unit at least includes first to fourth amplifiers, and an input terminal of the first amplifier is connected to the output terminal of the amplifier unit, input terminals of the second amplifier and the third amplifier are connected to an output terminal of the first amplifier, and an input terminal of the fourth amplifier is connected to an output terminal of the second amplifier.

(3)

The optical reception circuit according to (2), wherein each of the first to fourth amplifiers includes a static CMOS-type inverter circuit.

(4)

The optical reception circuit according to any one of (1) to (3), wherein the amplifier unit at least includes fifth to ninth amplifiers, and an input terminal of the fifth amplifier and an input terminal of the sixth amplifier are connected to the output terminal of the current-voltage conversion unit and an input terminal of the seventh amplifier is connected to an output terminal of the fifth amplifier, and an output terminal of the eighth amplifier and an input terminal of the ninth amplifier are connected to an output terminal of the sixth amplifier and an input terminal of the eighth amplifier and an output terminal of the ninth amplifier are connected to an output terminal of the seventh amplifier.

(5)

The optical reception circuit according to (4), wherein each of the fifth to ninth amplifiers includes a static CMOS-type inverter circuit.

(6)

An optical reception device including: a light receiving element configured to output a single-end current signal which is a photoelectrically converted optical signal; a current-voltage conversion unit to which the single-end current signal is input from the light receiving element and which is configured to convert the single-end current signal into a single-end voltage signal and to output the converted signal from an output terminal; an amplifier unit an input terminal of which is connected to the output terminal of the current-voltage conversion unit and which is configured to amplify the single-end voltage signal to predetermined amplitude set in advance and to output the amplified signal from an output terminal; and a differential conversion unit an input terminal of which is connected to the output terminal of the amplifier unit and which is configured to output a differential voltage signal which is a differentiated single-end voltage signal amplified in the amplifier unit.

(7)

The optical reception device according to (6), wherein a plurality of optical reception circuits, each of which includes the current-voltage conversion unit, the amplifier unit, and the differential conversion unit, is arranged therein and it is possible to convert current signals into voltage signals respectively in parallel in the optical reception circuits.

(8)

An optical transmission system including: an optical transmission device including an optical transmission circuit configured to convert an optically transmitted signal into a current signal and a light source for optical communication configured to convert the current signal, which is converted in the optical transmission circuit, into an optical signal; and an optical reception device including a light receiving element configured to receive the optical signal through an optical transmission path and to output a single-end current signal which is the optical signal converted photoelectrically and an optical reception circuit configured to perform voltage conversion on the current signal output from the light receiving element, wherein the optical reception circuit includes a current-voltage conversion unit to which a single-end current signal, which is a photoelectrically converted optical signal, is input and which is configured to convert the single-end current signal into a single-end voltage signal and to output the converted signal from an output terminal, an amplifier unit an input terminal of which is connected to the output terminal of the current-voltage conversion unit and which is configured to amplify the single-end voltage signal to predetermined amplitude set in advance and to output the amplified signal from an output terminal, and a differential conversion unit an input terminal of which is connected to the output terminal of the amplifier unit and which is configured to output a differential voltage signal which is a differentiated single-end voltage signal amplified in the amplifier unit.

(9)

The optical transmission system according to (8), wherein in the optical reception device, a plurality of optical reception circuits is arranged and it is possible to receive optical signals respectively in parallel in the optical reception circuits.

It should be noted that the present embodiments are not limited to the above described embodiments, and various modifications may be made without departing from the scope of the present disclosure.

REFERENCE SIGNS LIST 11 optical transmission system
12 optical transmission device
13 optical transmission path
14 optical reception device
21 signal processing circuit
22 optical transmission circuit
23 light source for optical communication
31 light receiving element
32 optical reception circuit
33 signal processing circuit
71 current-voltage conversion unit
72 amplifier unit
73 differential conversion unit
74 amplifier
75 feedback resistance
76 limiting amplifier
77 amplifier
78 PMOS-type transistor
79 NMOS-type transistor
81 to 84 amplifier
91 to 95 amplifier

The invention claimed is:

1. An optical reception circuit comprising:
a current-voltage conversion unit including an input that receives a single-end current signal, which is a photoelectrically converted optical signal, the current-voltage conversion unit being configured to convert the single-end current signal into a single-end voltage signal and to output the converted signal from an output terminal;
an amplifier unit including an input terminal that is connected to the output terminal of the current-voltage conversion unit, the amplifier unit being configured to amplify the single-end voltage signal to predetermined amplitude set in advance and to output the amplified signal from an output terminal; and
a differential conversion unit including an input terminal connected to the output terminal of the amplifier unit, the differential conversion unit being configured to output a differential voltage signal which is a differentiated single-end voltage signal amplified in the amplifier unit,
wherein the differential conversion unit at least includes first to fourth amplifiers, and
an input terminal of the first amplifier is connected to the output terminal of the amplifier unit, input terminals of the second amplifier and the third amplifier are connected to an output terminal of the first amplifier, and an input terminal of the fourth amplifier is connected to an output terminal of the second amplifier.

2. The optical reception circuit according to claim 1, wherein each of the first to fourth amplifiers includes a static complementary metal oxide semiconductor (CMOS)-type inverter circuit.

3. An optical reception device comprising:
the optical reception circuit according to claim 1; and
a light receiving element configured to output the single-end current signal to the current-voltage conversion unit.

4. The optical reception device according to claim 3, wherein the optical reception circuit is one of a plurality of optical reception circuits, each of which includes a respective current-voltage conversion unit, amplifier unit, and differential conversion unit for respectively converting current signals into voltage signals in parallel.

5. The optical reception device according to claim 3, wherein each of the first to fourth amplifiers includes a static CMOS-type inverter circuit.

6. An optical reception circuit comprising:
a current-voltage conversion unit including an input that receives a single-end current signal, which is a photoelectrically converted optical signal, the current-voltage conversion unit being configured to convert the single-end current signal into a single-end voltage signal and to output the converted signal from an output terminal;
an amplifier unit including an input terminal that is connected to the output terminal of the current-voltage conversion unit, the amplifier unit being configured to amplify the single-end voltage signal to predetermined amplitude set in advance and to output the amplified signal from an output terminal; and
a differential conversion unit including an input terminal connected to the output terminal of the amplifier unit, the differential conversion unit being configured to output a differential voltage signal which is a differentiated single-end voltage signal amplified in the amplifier unit,
wherein the amplifier unit at least includes first to fifth amplifiers, and
an input terminal of the first amplifier and an input terminal of the second amplifier are connected to the output terminal of the current-voltage conversion unit and an input terminal of seventh third amplifier is connected to an output terminal of the first amplifier, and
an output terminal of the fourth amplifier and an input terminal of the fifth amplifier are connected to an output terminal of the second amplifier and an input terminal of the fourth amplifier and an output terminal of the fifth amplifier are connected to an output terminal of the third amplifier.

7. The optical reception circuit according to claim 6, wherein each of the first to fifth amplifiers includes a static CMOS-type inverter circuit.

8. An optical reception device comprising:
the optical reception circuit according to claim 6; and
a light receiving element configured to output the single-end current signal to the current-voltage conversion unit.

9. The optical reception device according to claim 8, wherein each of the first to fifth amplifiers includes a static CMOS-type inverter circuit.

10. An optical transmission system comprising:
an optical transmission device including an optical transmission circuit configured to convert an optically transmitted signal into a current signal and a light source for optical communication configured to convert the current signal, which is converted in the optical transmission circuit, into an optical signal; and
an optical reception device including a light receiving element configured to receive the optical signal through an optical transmission path and to output a single-end current signal which is the optical signal converted photoelectrically and an optical reception circuit configured to perform voltage conversion on the current signal output from the light receiving element,
wherein the optical reception circuit includes
a current-voltage conversion unit including an input that receives the single-end current signal the current-voltage conversion unit being configured to convert the single-end current signal into a single-end voltage signal and to output the converted signal from an output terminal,
an amplifier unit including an input terminal that is connected to the output terminal of the current-voltage conversion unit, the amplifier unit being configured to amplify the single-end voltage signal to predetermined amplitude set in advance and to output the amplified signal from an output terminal, and
a differential conversion unit including an input terminal connected to the output terminal of the amplifier unit, the differential conversion unit being configured to output a differential voltage signal which is a differentiated single-end voltage signal amplified in the amplifier unit,
wherein the differential conversion unit at least includes first to fourth amplifiers, and
an input terminal of the first amplifier is connected to the output terminal of the amplifier unit, input terminals of the second amplifier and the third amplifier are connected to an output terminal of the first amplifier, and an input terminal of the fourth amplifier is connected to an output terminal of the second amplifier.

11. The optical transmission system according to claim 10, wherein in the optical reception device, the optical reception circuit is one of a plurality of optical reception circuits arranged to receive optical signals respectively in parallel.

* * * * *